(12) United States Patent
Douglas et al.

(10) Patent No.: US 10,474,990 B2
(45) Date of Patent: *Nov. 12, 2019

(54) SYSTEMS AND METHODS FOR MOBILE DEVICE-BASED ITEM ACQUISITION AND TRACKING

(71) Applicant: Capital One Services, LLC, McLean, VA (US)

(72) Inventors: Lawrence Hutch Douglas, McLean, VA (US); Thomas Christopher Clarke, Apex, NC (US); Deborah Nally, Williamsburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,355

(22) Filed: Jan. 22, 2019

(65) Prior Publication Data
US 2019/0156272 A1  May 23, 2019

Related U.S. Application Data

(60) Continuation of application No. 16/130,399, filed on Sep. 13, 2018, which is a division of application No.
(Continued)

(51) Int. Cl.
*G06Q 20/32* (2012.01)
*G06Q 10/08* (2012.01)
(Continued)

(52) U.S. Cl.
CPC ....... *G06Q 10/087* (2013.01); *G06K 7/10386* (2013.01); *G06Q 20/20* (2013.01);
(Continued)

(58) Field of Classification Search
None
See application file for complete search history.

(56) References Cited

U.S. PATENT DOCUMENTS 9,336,547 B2   5/2016 Acker, Jr. et al.
10,102,497 B2 * 10/2018 Douglas ............... G06Q 10/087
(Continued)

*Primary Examiner* — Christle I Marshall
(74) *Attorney, Agent, or Firm* — Finnegan, Henderson, Farabow, Garrett & Dunner, LLP

(57) ABSTRACT

Systems, methods, and computer-readable media are provided for enabling mobile device-based item acquisition and tracking. One exemplary method performed on a mobile device comprises entering a wireless scan mode, detecting a signal from a tag associated with an item in a first area and in proximity to the tag, presenting information associated with the tag, and adding the information to a list. The method further comprises detecting a second tag in a second area, and sending the list to a second device. A second exemplary method performed by a processing terminal comprises receiving the list from a mobile device, entering a wireless scan mode, detecting a signal from a tag associated with an item in proximity to the tag, determining whether the item associated with the detected tag is present on the received list, and enabling the mobile device to complete a transaction to purchase the item. User interfaces are also provided for presenting information related to the above methods and receiving inputs from users to accomplish one or more related methods.

16 Claims, 8 Drawing Sheets

Related U.S. Application Data

15/185,887, filed on Jun. 17, 2016, now Pat. No. 10,102,497.

(60) Provisional application No. 62/182,126, filed on Jun. 19, 2015.

(51) Int. Cl.
*G07G 1/00* (2006.01)
*G06K 7/10* (2006.01)
*G06Q 20/20* (2012.01)

(52) U.S. Cl.
CPC ......... *G06Q 20/208* (2013.01); *G06Q 20/327* (2013.01); *G07G 1/009* (2013.01)

(56) References Cited

U.S. PATENT DOCUMENTS

| | | |
|---|---|---|
| 10,242,340 B2 * | 3/2019 | Douglas ............... G06Q 10/087 |
| 2006/0043175 A1 | 3/2006 | Fu |
| 2008/0150695 A1 | 6/2008 | Batra |
| 2009/0256672 A1 | 10/2009 | Yamamoto et al. |
| 2010/0079240 A1 | 4/2010 | Higham |
| 2010/0161434 A1 | 6/2010 | Herwig et al. |
| 2011/0295671 A1 | 12/2011 | Thomas et al. |
| 2014/0214589 A1 | 7/2014 | Pedley et al. |
| 2015/0051994 A1 | 2/2015 | Ward |
| 2015/0134470 A1 | 5/2015 | Hejl et al. |
| 2015/0221020 A1 | 8/2015 | Kobres |
| 2015/0356285 A1 | 12/2015 | Glaser |
| 2016/0371766 A1 | 12/2016 | Schmidt et al. |

\* cited by examiner

SYSTEMS AND METHODS FOR MOBILE DEVICE-BASED ITEM ACQUISITION AND TRACKING

RELATED APPLICATIONS

This application is a continuation of U.S. patent application Ser. No. 16/130,399, filed Sep. 13, 2018, which is a divisional application of U.S. patent application Ser. No. 15/185,887, filed Jun. 17, 2016 (now U.S. Pat. No. 10,102,497), which is entitled to and claims the benefit of priority from U.S. Provisional Application No. 62/182,126, filed Jun. 19, 2015, the contents of each of which are expressly incorporated herein by reference in their entirety.

BACKGROUND

Reliably determining a set of items that are being transported from one place to another is a problem that exists in multiple fields and disciplines.

As one example, a consumer at a brick-and-mortar store location may place upwards of 30 items into a single shopping cart. When the consumer reaches a point of sale device, such as a cash register or a self-checkout device, the consumer must unload all of the items from the cart, place them on a sticky and/or germ-covered conveyor belt, manually scan each item or select each item from a menu. After paying for the items, the consumer or a clerk must place each item into a new bag and repack the shopping cart. When the consumer wants to buy a large item, they will typically need to find a sales clerk because the item cannot easily be transported to the point of sale or scanned. Finally, such a shopping experience can lead to errors, such as the clerk accidentally scanning an item twice or not scanning an item at all, that can lead to the consumer being charged too much or the store location giving away an item without payment.

As another example, a construction company may store goods such as lumber, nails, cement mix, or backhoes in warehouses. When moving to a new job site, the building company may need to transfer these goods to the new job site. Typical systems involve marking each item or container with a serial number, writing down each serial number, placing each serial number on a list, and shipping the goods with the list. When the goods arrive at the job site, a foreperson or inventory specialist may need to check the list to ensure that all goods were received. This causes delays and extra costs because a human being must manually determine whether goods were misplaced, modified, or stolen.

Moreover, while some computerized solutions exist for tracking items, they typically rely on large equipment that manually scans each item and requires confirmation from a user before taking any action with those items (such as purchase or movement of the items). This is inconvenient. Moreover, such systems typically require specialized equipment that is expensive, require manual entry of information about the items, cannot determine when a user has decided to not keep an item, cannot perform functions or initiate transactions for the user, and do not provide the interactivity necessary to ensure that a user fully understands when an item is ready to be purchased or checked out.

There is thus a need to address these and other issues. The present disclosure provides devices, methods, systems, and computer-readable media to solve these and other issues.

SUMMARY

Disclosed embodiments include methods, systems, and computer-readable media configured to, for example, provide mobile device-based item acquisition and tracking. In one aspect, an exemplary method is provided. The method, which may be performed on a mobile device, comprises entering a wireless scan mode, detecting a signal from a tag associated with an item in a first area and in proximity to the tag, presenting information associated with the tag, and adding the information to a list. The method further comprises detecting a second tag in a second area, and sending the list to a second device, such as a processing terminal (e.g., a checkout device).

A second exemplary method, which may be performed by a processing terminal such as a checkout device, comprises receiving a list from a mobile device, entering a wireless scan mode, detecting a signal from a tag associated with an item in proximity to the tag, determining whether the item associated with the detected tag is present on the received list, and enabling the mobile device to complete a transaction to purchase the item.

User interface methods are also provided for presenting information related to the above methods and receiving inputs from users to accomplish one or more related methods. For example, a third exemplary method, which may be performed by a mobile device, comprises detecting a signal from a tag associated with an item in a first area and in proximity to the tag, and presenting a user interface on the mobile device including: first item information associated with the tag, second item information associated with a second tag that is within scanning range of the mobile device, and buttons configured to cause items to no longer be displayed on the user interface. The method further comprises detecting a third tag associated with a second area separate from the first area, presenting at least one of the first item information and second item information and a request to confirm checkout, receiving a confirmation from the user, and based on receiving a confirmation, sending a message over a wireless network to initiate checkout.

Systems and computer-readable media implementing the above method are also provided.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors configured as special-purpose processor(s) based on software instructions that are programmed with logic and instructions that perform, when executed, one or more operations consistent with the disclosed embodiments. Moreover, aspects of the disclosed embodiments may be implemented on specialized (rather than generic) equipment or devices.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. Embodiments of the present disclosure relate to a mobile device detecting tags affixed to or associated with items and maintaining a list of those detected items on the mobile device or another device. In some embodiments, the list may be a shopping cart or checkout list.

Figure 1:
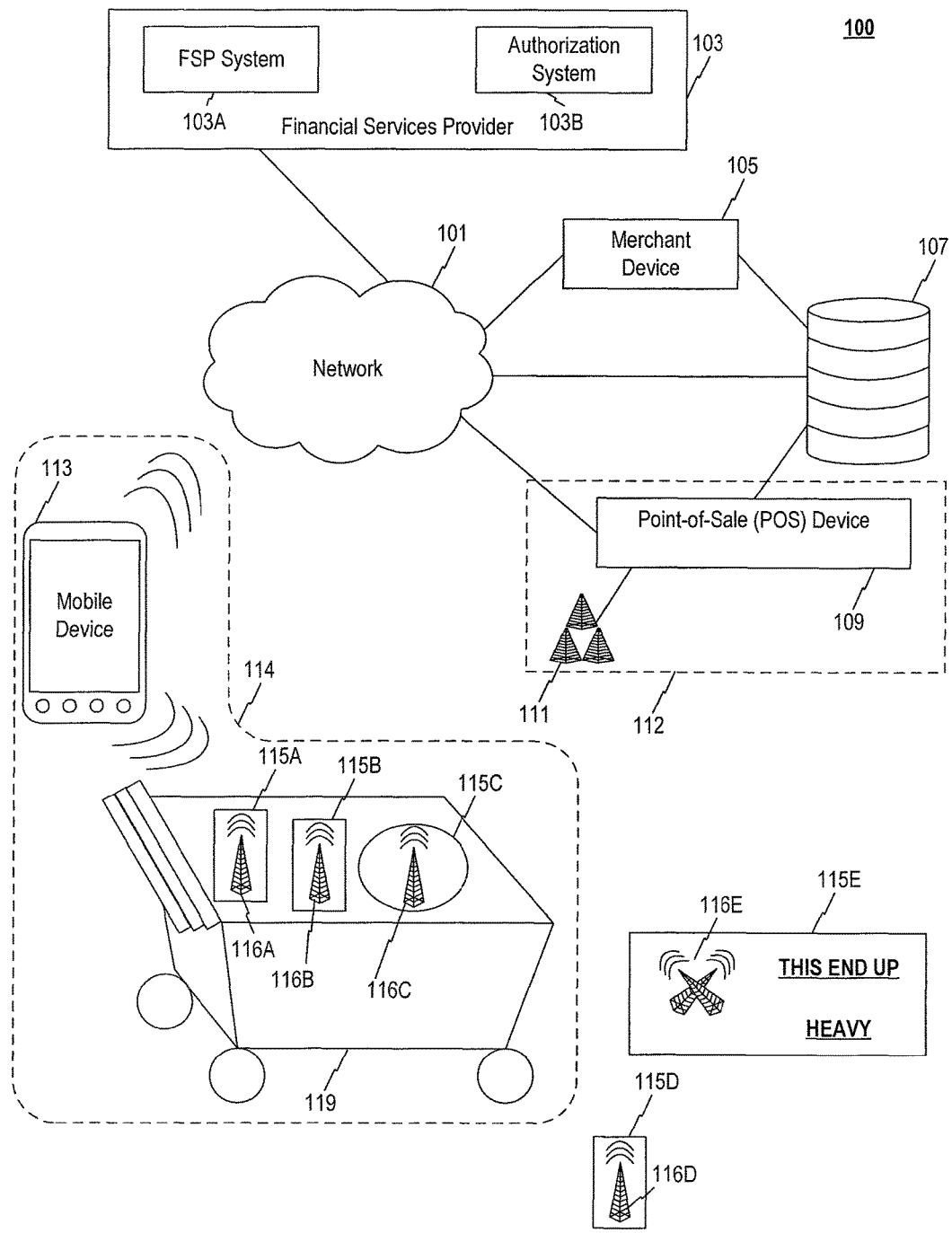
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more of the following: a network 101, a financial services provider (FSP) 103, a merchant device 105, a database 107, a point-of-sale (POS) device 109, a checkout tag 111, a mobile device 113, small item tags 116A, 116B, 116C, and 116D, and large item tag 116E. The components and arrangement of the components included in system 100 may vary. Thus, system 100 may include other components that perform or assist in the performance of one or more processes consistent with the disclosed embodiments.

Components of system 100 may be computing systems configured to provide systems and method for pre-authorizing a transaction request, consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with financial service provider 103, merchant device 105, database 107, POS device 109 (also referred to more generally herein as a processing terminal), and/or mobile device 113. In certain aspects, users may operate one or more components of system 100 to initiate and provide input for one or more operations consistent with the disclosed embodiments.

Network 101 may be any type of network configured to provide communications between components of system 100. For example, network 101 may be any type of network (including infrastructure) that provides communications, exchanges information, and/or facilitates the exchange of information, such as the Internet, a Local Area Network, Near-Field Communication (NFC), Bluetooth, or other suitable connection(s) that enables the sending and receiving of information between the components of system 100. In other embodiments, one or more components of system 100 may communicate directly through a dedicated communication link(s), such as links between financial service provider 103, merchant device 105, POS device 109, and/or mobile device 113.

Financial service provider 103 may be an entity that provides, maintains, manages, or otherwise offers financial services. For example, financial service provider 103 may be a bank, credit union, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 103 may include infrastructure and components that are configured to generate and/or provide financial service accounts such as credit card accounts, checking accounts, debit card accounts, loyalty or reward programs, lines of credit, or the like. Consistent with certain disclosed embodiments, financial service provider 103 may provide manufacturer-based financial service accounts, which may be financial service accounts that are associated with a manufacturer of products or services, such as a merchant.

Financial service provider 103 may include one or more financial service provider systems (FSP System) 103A. In one aspect, financial service provider system 103A may be one or more computing devices configured to perform one or more operations consistent with disclosed embodiments. In one aspect, financial service provider system 103A may be a desktop computer, a server, or any other type of computing device. Financial service provider system 103A may include one or more processors configured to execute software instructions stored in memory. The one or more processors may be configured to execute software instructions that when executed by a processor performs known Internet-related communication and financial service-based processes. For instance, financial service provider system 103A may execute software that provides data used for generating and displaying interfaces, including content on a display device included in, or connected to, mobile device 113. Financial service provider system 103A may also receive transaction authentication requests from mobile device 113, POS device 109, merchant 105, and/or network 101, and may send these transaction requests to authorization system 103B for processing. Financial service provider system 103A may also send responses to the received transaction requests to mobile device 113, merchant 105, POS device 109, and/or network 101.

Financial service provider 110 may include one or more authorization systems 103B. In one aspect, authorization system 103B may be one or more computing devices configured to perform one or more operations consistent with disclosed embodiments. For example, authorization system 103B may be a desktop computer, a server, or any other type of computing device. Authorization system 103B may include one or more processors configured to execute software instructions stored in memory. The one or more processors may be configured to execute software instructions that when executed by the one or more processors perform methods that enable the processing of financial transaction authorization requests. For instance, processing financial transaction authorization requests may involve communicating with one or more other systems to determine whether an account associated with the request includes a enough balance or credit to fulfill the associated transaction. The one or more processors may also be configured to enable the detection of potentially fraudulent transaction requests. For instance, authorization system 103B may receive a transaction request from financial service provider system 103A and may determine whether the received transaction request is potentially fraudulent, using transaction analysis procedures known in the art.

Merchant device 105 may be operated by an entity that offers goods, services, and/or information, such as a big box retailer (e.g., a superstore/supercenter), a specialty store (e.g., a running store), a grocery store, a service provider (e.g., a utility company), or any other type of entity that offers goods, services, and/or information that consumers (such as end-users or other business entities) may purchase, consume, use, etc.

Merchant device 105 may include one or more computing systems, such as server(s), desktop computers, etc., that are configured to execute stored software instructions to perform operations associated with a merchant, including one or more processes associated with processing purchase transaction requests, generating transaction request data, generating product data (e.g., SKU data) relating to transaction requests, etc. Merchant device 105 may perform one or more operations consistent with the disclosed embodiments. For example, merchant system 105 may receive information related to a list of items displayed and/or stored on mobile device 113 (e.g., a shopping cart). Merchant device 105 may also store the list of items in database 107 and/or memory in merchant device 105. Merchant device 105 may also receive identifiers associated with tags 116A-116E, perform a lookup in database 107 using the identifiers, and send (e.g., to mobile device 113 or POS device 109) information about the associated items, such as price, name, or description. The disclosed embodiments are not limited to any particular configuration of merchant system 122.

Database 107, in some embodiments, may store information usable by devices such as merchant device 105, POS device 109, or mobile device 113. As one example, database 107 may store information related to tags (e.g., tags 116A-116E) that are placed on items (e.g., items 115A-115E). The information may include, for example, one or more unique identifiers that identify an item that a tag is attached to. Examples would include a 16-bit UUID (or a "Universally Unique Identifier"), a two-bit major identifier, a two-bit minor identifier, etc. Database 107 may, in some embodiments, store information about one or more of these fields, along with information related to a product that each tag is attached to or associated with. For example, if a tag is attached to a cereal box, database 107 may store information about the cereal, such as the name, the weight, the price, the size/weight of the box, nutrition information, a UPC (Universal Product Code) on the box, or the like.

As another example, database 107 may include information about customers. For example, in situations where a user registers mobile device 113 in advance of coming to a store, database 107 may store information such as a name of the user, a home address of the user (e.g., for delivery of large items), one or more credit cards, debit cards, checking accounts, or payment accounts (e.g., a PAYPAL username), a phone number, or a description/color image of the user (e.g., for verifying the user's appearance).

POS device 109 may, in some embodiments, be implemented as a cash register or other device for presenting purchase information to a user, such as a consumer. For example, POS device 109 may be implemented as a self-checkout terminal that presents a list of all goods a customer has brought to the vicinity of POS device 109, along with a final total for all of the goods (e.g., including tax and delivery fees). (In some embodiments, for example, where system 100 is not related to a purchase transaction, POS device 109 may be optional or omitted.)

In some embodiments, merchant device 105 may be combined with database 107 and/or POS device 109.

Checkout tag 111 may, in some embodiments, be implemented as one or more tags that indicate to devices (such as mobile device 113) of the boundaries of a particular zone 112 of a physical area such as a store. For example, in situations where system 100 is implemented in a store (e.g., a brick-and-mortar merchant location), checkout tags 111 may indicate a checkout zone 112. Checkout zone 112, in some embodiments, may be an area surrounding POS device 109 in which a user can use mobile device 113 to finalize a current list of goods for purchase. In other situations (e.g., equipment tracking), checkout tag 111 may indicate an area in which goods surrounding mobile device 113 should be checked (e.g., using a device to scan for tags associated with such goods) to determine whether they are in the zone or not.

Mobile device 113 may be one or more computing devices configured to perform one or more operations consistent with disclosed embodiments. in one example, mobile device 113 may be a tablet, a smart phone, a cellular phone, a personal digital assistant (PDA), a media device (such as an iPod®), or any other type of computing device. As mentioned herein, however, the disclosed embodiments are not limited to such examples. (For example, in embodiments where a user is not likely to carry mobile device 113 or mobile device 113 is generally stationary, mobile device 113 may be implemented as a desktop, a laptop, or the like.)

Mobile device 113 may include one or more processors configured to execute software instructions stored in memory, such as memory included in mobile device 113. Mobile device 113 may include software that when executed by a processor performs known Internet-related communication, content display processes, and financial service-related processes for a user of mobile device 113. For instance, mobile device 113 may execute browser or related mobile display software that generates and displays interfaces including content on a display device included in, or in communication with, mobile device 113. Mobile device 113 may execute applications and/or communication software that allows mobile device 113 to communicate with components over network 101, and generates and displays content in interfaces via a display device included in mobile device 113. The disclosed embodiments are not limited to any particular configuration of mobile device 113. In some embodiments, mobile device 113 may be configured to execute software instructions relating to location services, such as determining a location using GPS or Wi-Fi® networks. For example, mobile device 113 may be configured to determine a geographic location of mobile device 113 and provide corresponding location and time stamp data.

Mobile device 113 may be configured to communicate with network 101 using wired connections (e.g., Ethernet-based connections) or wireless connections (e.g., IEEE 802.11 wireless or "Wi-Fi" connections), and may be configured to communicate with tags 111 and 116A-116E using wireless connections (e.g., Bluetooth or Wi-Fi).

Mobile device 113 may be configured to communicate with tags 111 and 116A-116E if the tags are inside of a detection zone 114. In some embodiments, mobile device 113 may be set to a particular mode such that it will only detect tags within detection zone 114. As one example, mobile device 113 may be programmable to detect tags in three different ranges. If tags 111 and 116A-116E are implemented as BLE (Bluetooth Low Energy tags), there may be three ranges for use by mobile device 113 and tags 111 and 116A-116E: an "immediate" range (within roughly a few centimeters of mobile device 113), a "near" range (within roughly 5 meters of mobile device 113), and a "far" range (within roughly ten meters from mobile device 113). These ranges are approximate and may depend, in part, on the conditions in which the detection takes place. For example, if there is a lot of electromagnetic noise or interference from other tags in the same area, these distances may be reduced. Similarly, repeaters may exist to receive and retransmit signals, which may increase these distances. Detection zone 114 may differ based on what mobile device 113 is configured to detect (e.g., by the user or by software on mobile device 113).

Product tags 116A-116E, in some embodiments, may be attached to or otherwise associated with items such as 115A-115E, respectively. Each product tag, as explained above with respect to database 107, may include a unique identifier and/or other information identifying an item to which a tag is attached. In some embodiments, tags 116A-116E may be implemented as Bluetooth Low Energy (BLE) tags. Tags 116A-116E may also include sensors such as temperature sensors, weight sensors, motion sensors, accelerometers, or the like.

In exemplary FIG. 1, items 115A, 115B, and 115C are all in a shopping cart 119 associated with a user holding mobile device 113. Tags 116A, 116B, and 116C may include respective information about each item, such as a unique identifier for the associated tag, a price of the item, a description of the item, or the like.

Tag 116D (affixed to good 115D) is outside of detection zone 114. When mobile device 113 attempts to read data from tags inside of detection zone 114, mobile device 113 may not receive any data from tag 116D as it is outside of detection zone 114. As another example, if a user initially possessed item 115D (e.g., in cart 119) but placed it back on a shelf or left it with a store clerk, mobile device 113 may no longer detect item 115D, and may then determine that the consumer no longer desires to acquire that item, and may prompt the user to confirm that item 115D is no longer desired and/or remove it from a list.

Tag 116E (affixed to heavy item 115E) is also outside of detection zone 114. Tag 116E, however, may include data that indicates that heavy item 115E is not easily moved, requires store clerk assistance to purchase, and/or is intended to be shipped to a consumer's home. In each of these situations, item 115E need not always be within detection zone 114 in order for a consumer to purchase it. As explained below, in some embodiments, a consumer may confirm a desire to purchase good 115E but may not need to keep the good inside of detection zone 114 in order to maintain it on a list or electronic shopping cart maintained on mobile device 113. (In other embodiments, item 115E may not be "heavy," but may be an item otherwise not suitable to be carried by a user or placed in a cart/basket, such as a magazine subscription or digital good.)

In one example embodiment, tags 111 and 116A-116E may also be implemented using Near-Field Communication (NFC) technology. In another embodiment, tags 111 and 116A-116E may be implemented using BLE (Bluetooth Low Energy) devices implementing the Apple iBeacon standard. Other embodiments using other types of tags or sensors are possible as well (such as Bluetooth, RFID, or the like).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, financial service provider system 103 and merchant device 105 may constitute a part of components of system 100 other than those specifically described, or may constitute a part of multiple components of system 100 (i.e., a distributed system).

Figure 2:
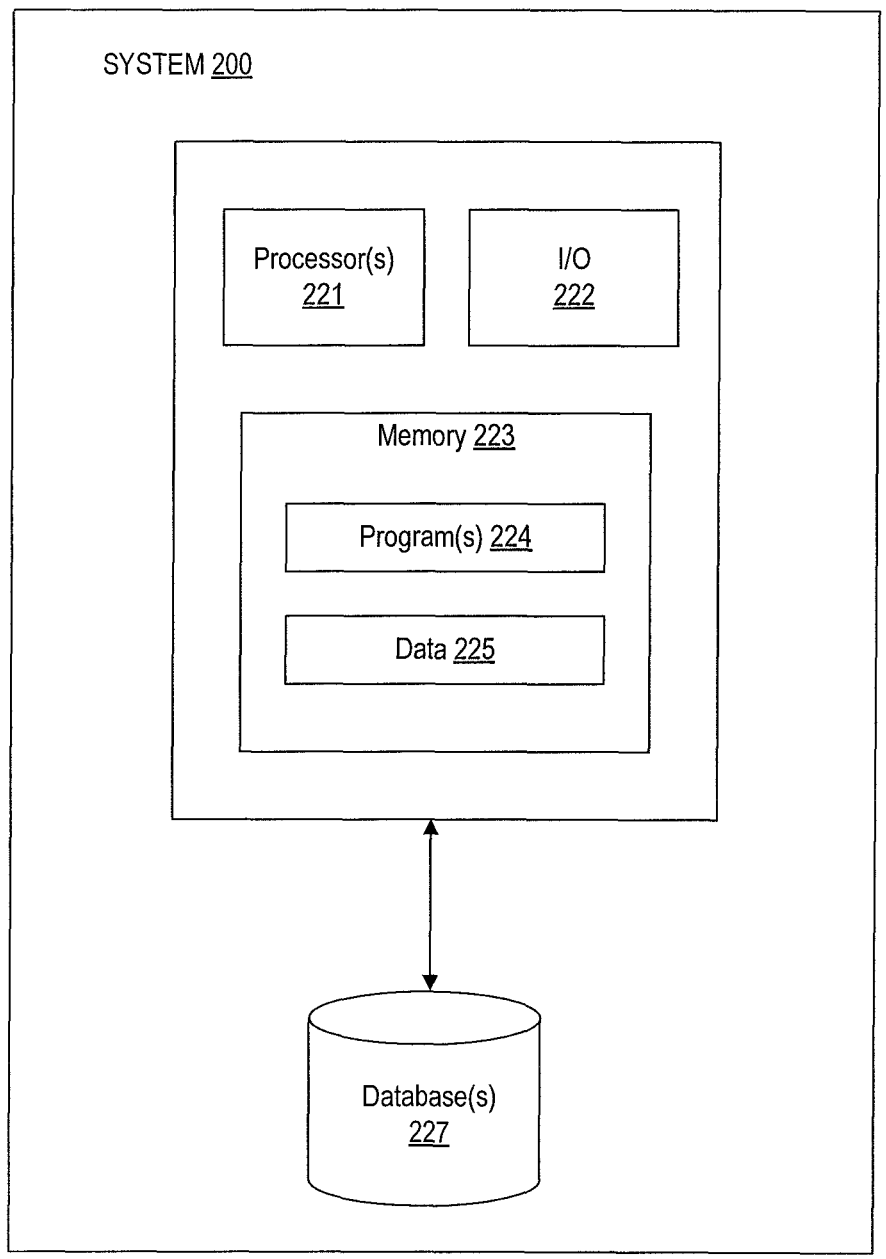
FIG. 2 is a diagram of an exemplary electronic system, consistent with disclosed embodiments.

FIG. 2 shows an exemplary electronic system 200 consistent with disclosed embodiments. Variations of exemplary system 200 may be used to implement portions or all of devices of system 100, such as financial service provider 103, merchant device 105, database 107, POS device 109, and/or mobile device 113. In one embodiment, system 200 may comprise one or more processors 221, one or more input/output (I/O) devices 222, and one or more memories 223. In some embodiments, system 200 may take the form of a server, general purpose computer, mainframe computer, or the like. In some embodiments, system 200 may take the form of a mobile computing device such as a smartphone, tablet, laptop computer, or the like. Alternatively, system 200 may be configured as a particular apparatus, embedded system, dedicated circuit, or the like, based on the storage, execution, and/or implementation of the software instructions that perform one or more operations consistent with the disclosed embodiments.

Processor(s) 221 may include one or more known processing devices, such as mobile device microprocessors, desktop microprocessors, server microprocessors, or the like. The disclosed embodiments are not limited to a particular type of processor.

Memory 223 may include one or more storage devices configured to store instructions usable by processor 221 to perform functions related to the disclosed embodiments. For example, memory 223 may be configured with one or more software instructions, such as program(s) 224 that perform one or more operations when executed by processor 221. The disclosed embodiments are not limited to separate programs or computers configured to perform dedicated tasks. For example, memory 223 may include a single program or multiple programs that perform the functions of mobile device 130. Memory 223 may also store data 225 that is used by one or more programs 224.

Figure 4A:
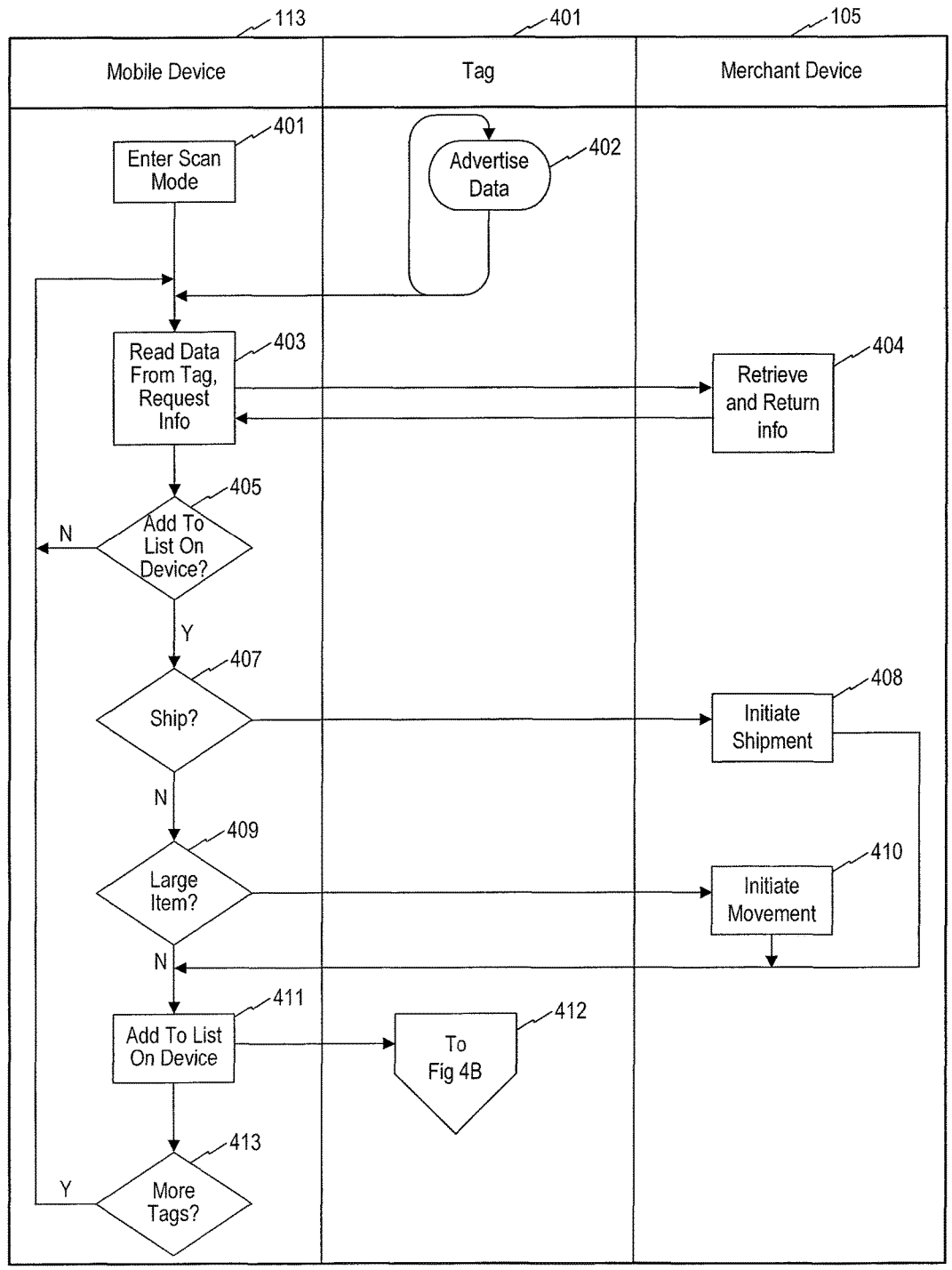
FIG. 4A is a flowchart of an exemplary process for discovering items associated with tags using a mobile device.
Figure 4B:
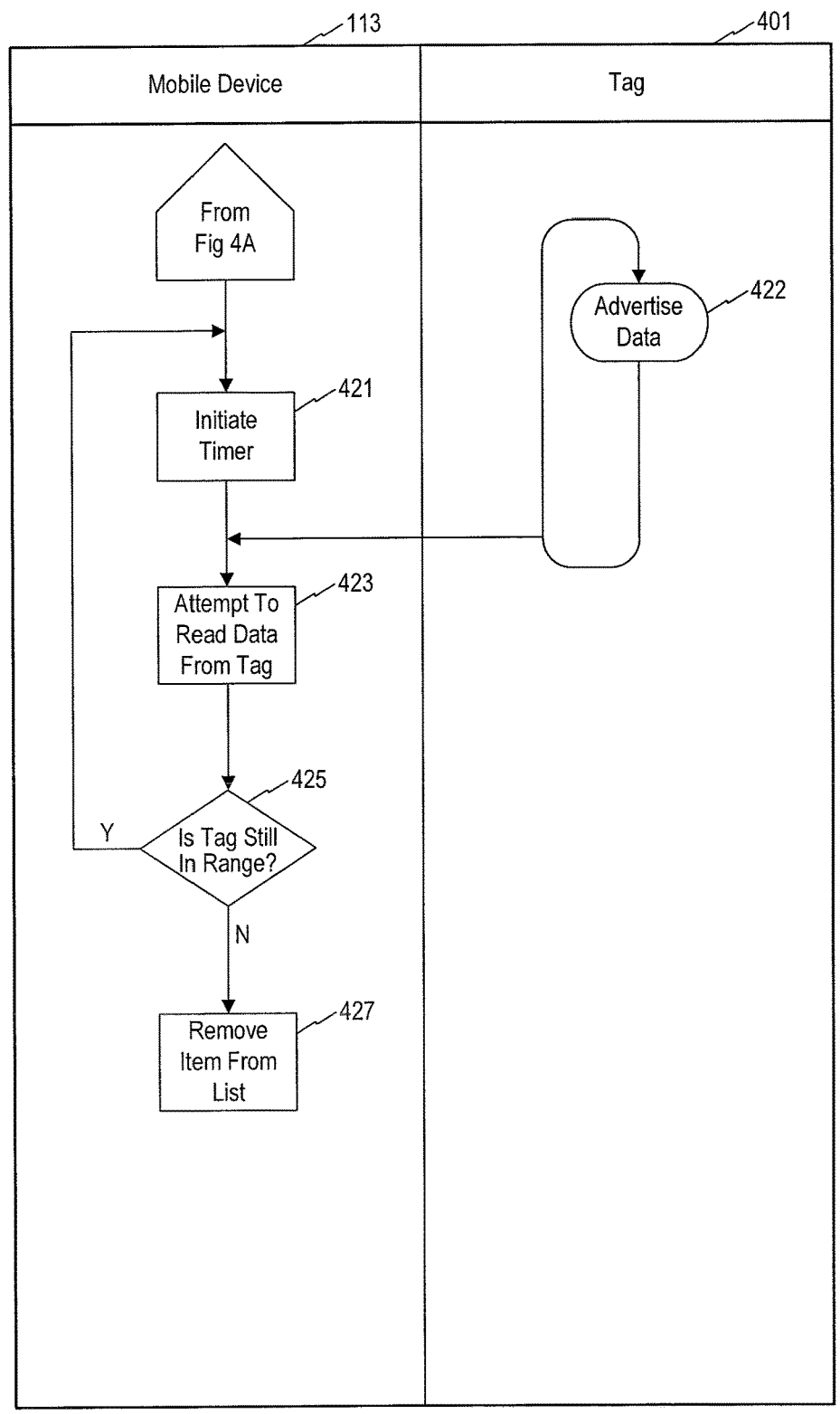
FIG. 4B is a flowchart of an exemplary process for determining whether a mobile device is still within range of a previously-detected item.
Figure 4C:
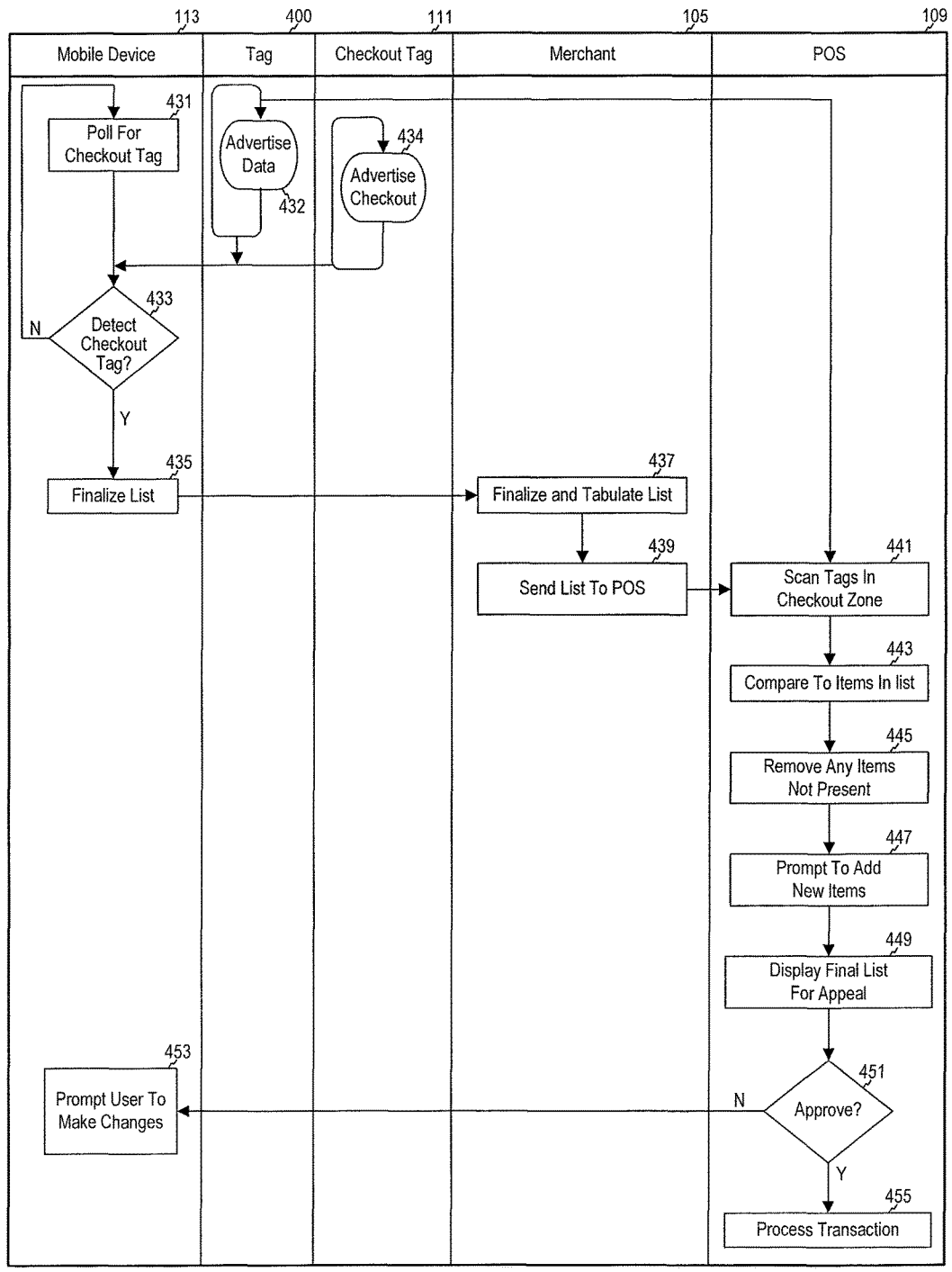
FIG. 4C is a flowchart of an exemplary process for enabling checkout of items discovered using a mobile device.

In certain embodiments, memory 223 may store software executable by processor(s) 221 to perform one or more methods, such as the methods represented by the flowcharts depicted in FIGS. 4A-4C and/or the methods associated with user interfaces in FIGS. 5A-5D.

I/O devices 222 may be one or more devices configured to allow data to be received and/or transmitted by system 200. I/O devices 222 may include one or more digital and/or analog devices that allow system 200 to communicate with other machines and devices, such as other components of system 100. For example, I/O devices 222 may include a screen for displaying messages to a user (such as a consumer). I/O devices 222 may also include one or more digital and/or analog devices that allow a user to interact with system 200 such as a touch-sensitive area, keyboard, buttons, or microphones. I/O devices 222 may also include other components known in the art for interacting with a user. I/O devices 222 may also include one or more hardware/software components for communicating with other components of system 100. For example, I/O devices 222 may include a wired network adapter, a wireless network adapter, a cellular network adapter, or the like. Such network components enable system 200 to communicate with other systems to send and receive data.

The components of system 200 may be implemented in hardware, software, or a combination of both hardware and software, as will be apparent to those skilled in the art. For example, although one or more components of system 200 may be implemented as computer processing instructions, all or a portion of the functionality of system 200 may be implemented instead in dedicated electronics hardware.

Figure 3A:
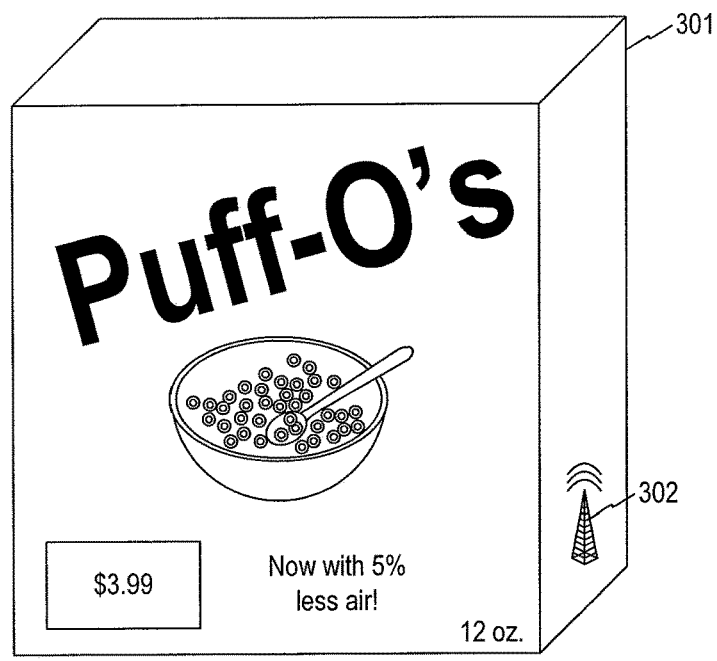
FIG. 3A is a diagram of an exemplary item that can be moved by a consumer and a corresponding tag.

FIG. 3A is a diagram of an exemplary item 301 that can be moved by a user and a corresponding tag 302. Item 301 may be a small item that fits inside of a shopping cart, a shopping basket, or a user's arms. For example, item 301 is depicted as a cereal box. Item 301 is associated with tag 302. In some embodiments, for an item that can be easily transported by a user, such as a cereal box, tags are attached to the outside or the inside of the item to enable easy capture of the tag by a device (such as POS device 109 or mobile device 113). As explained above, tag 302 may contain a unique identifier or other information about item 301, such as a price, a name, a weight, or the like.

When a consumer holding or using mobile device 113 picks up cereal box 301, cereal box 301 may enter the scanning range of mobile device 113. Mobile device 113 may read tag 302, may determine that tag 302 is related to an item that can be carried by the user, and may place item 302 onto a list associated with mobile device 113 (e.g., an electronic shopping cart).

Figure 3B:
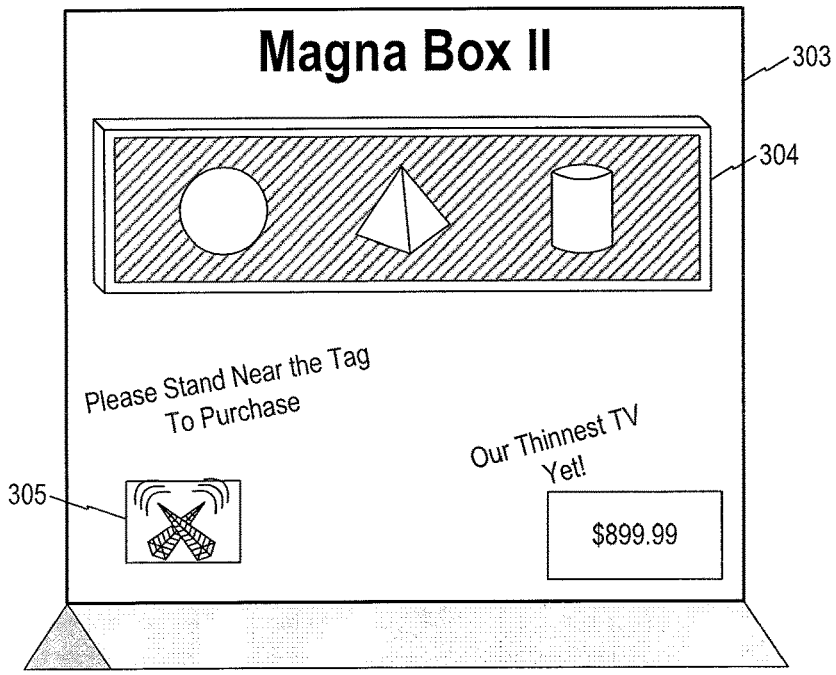
FIG. 3B is a diagram of an exemplary item that may not be able to be moved by a consumer and a corresponding tag.

FIG. 3B is a diagram of an exemplary item 304 that may not be readily movable (e.g., suitable for being carried, set in a shopping cart, etc.) by a consumer and a corresponding tag 305. Promotional area 303 includes a television 304 and a tag 305. A consumer may be unable to readily carry television 304 because the consumer does not have a cart large enough to carry it, because it is too heavy, because the default delivery option for television 304 is shipment to the consumer's home, etc. In these embodiments, tag 305 may not be affixed to or otherwise attached to item 304 because the consumer will not carry item 304 to a POS device 109 or checkout zone 112. Rather, a consumer holding or using mobile device 113 may stand in the vicinity of tag 305. Tag 305 may include information that indicates to mobile device 113 that item 304 is too large to be carried by the consumer.

When a consumer holding or using mobile device 113 stands near tag 305, mobile device 113 may read tag 305, may determine that tag 305 is related to an item (television 304) that cannot be carried by the user, may prompt the user to learn more about television 304, add television 304 to a list associated with mobile device 113 (e.g., an electronic shopping cart), ship television 304 to a particular address, request that a store clerk bring television 304 to an area for later pickup, etc.

FIG. 4A is a flowchart of an exemplary process for discovering items associated with tags 400 using a mobile device 113. The process begins with step 401, where mobile device 113 enters a scan mode. As explained above, mobile device 113 may scan for tags in a particular zone surrounding mobile device 113. For example, step 401 may represent mobile device 113 scanning for tags in "near" mode (finding, for example, tags that are within five meters of mobile device 113).

Tag 400 may also begin transmitting data in step 402. In some embodiments, for example, embodiments where tag 400 is implemented as a Bluetooth Low Energy tag, tag 400 may transmit data at the end of a time interval (e.g., such as every 500 ms). So, in embodiments where tag 400 is a powered tag, step 402 may represent a periodic sending of data by tag 400. In other embodiments, such as those where passive RFID or other non-powered tags are used, tag 400 may only transmit data when it receives ambient energy transmitted by mobile device 113 (e.g., emitting a signal after receiving energy from radio waves generated by mobile device 113). Thus, in embodiments where tag 400 is a non-powered tag, step 402 may represent tag 400 receiving electromagnetic energy from mobile device 113 and using that energy to transmit data stored in tag 400.

In step 403, mobile device 113 may receive the data advertised by tag 400 and may determine what the data represents. For example, mobile device 113 may receive one or more identifiers (unique or non-unique) stored on tag 400. Step 403 may also represent mobile device 113 sending one or more of these identifiers to a device (e.g., sending to merchant device 105 via network 101) to request information about tag 400 or the item that tag 400 is associated with. For example, mobile device 113 may receive a 128-bit UUID such as 'a326e1d9-ed1c-427f-87e9-2d3a46bf6342' from tag 400. Mobile device 113 may also receive a "major" identifier such as '01' and a "minor" identifier such as 'a5.' (In some embodiments, the major and minor identifiers may be used to identify differences between similar items, such as a placement or a localization of the item.) Mobile device 113 may then send the UUID and the major and/or minor identifiers to merchant device 105. In step 404, merchant device 404 may retrieve one or more records associated with at least one of the received identifiers (UUID, major, minor, etc.) from a database (such as database 107), and return the information to mobile device 113. (In another embodiment, mobile device 113 may retrieve the records from database 107 directly.)

In step 405, mobile device 113 may determine whether to add the information received from merchant device 105 to a list. This list may be, for example, a shopping cart or other list stored on mobile device 113.

In some embodiments, step 405 may occur automatically. For example, mobile device 113 may be programmed to detect tag 400, determine that tag 400 is associated with an item that is easily carried by a consumer (e.g., a box of cereal), and determines that it should be added to a list on mobile device 113. Similarly, for other items associated with a tag 400, mobile device 113 may prompt the consumer to approve the adding of an item to a shopping cart. For example, if a consumer walks through an aisle of 60-inch televisions, mobile device 113 may present one or more of the televisions to the consumer requesting that the consumer confirm the addition to the shopping cart. (This avoids, for example, a consumer accidentally purchasing ten TVs in the same shopping trip.)

If the consumer does not wish to add the item to the list, or the mobile device 113 determines that the item should not be added to the list (e.g., because the tag 400 exited the range of mobile device 113 or the item is not eligible to be added to the list), the process may return to step 403 to read data from any other tags in the vicinity of mobile device 113. If, however, mobile device 113 determines to add the item to the list, the process continues to step 407.

In step 407, mobile device 113 determines whether or not to ship the item associated with tag 400. For example, if the consumer has approached a large item that cannot readily be carried in a shopping cart either because of size or logistics (e.g., a three-person kayak, a vacation package, a magazine subscription, etc.), mobile device 113 may prompt the user to accept shipment of the item, for example, to a home address of the consumer stored in database 107. If the consumer wishes the item brought to the front of the store, mobile device 113 may send a message indicating this to merchant device. The process may then continue to step 408, where merchant device 105 may initiate shipment of the item. This includes, for example, notifying a store clerk (e.g., by sending a message to a wireless device held by the clerk) to obtain the item from a storeroom, find a box large enough to ship the item, determine pricing for the item, determine shipment options, etc. (These steps, as well as others, may also be performed by a computer system dedicated or partially dedicated to determining shipment details.) After initiating shipping, the process may continue to step 411.

If, however, mobile device 113 does not request that the item be shipped (e.g., because it is not eligible for shipping or the consumer does not wish to ship the item), the process may continue to step 409. In step 409, mobile device 113 determines whether or not the item associated with tag 400 is "large." Defining what is "large" may depend in part on the environment in which the process takes place. For example, if the mobile device and tags are located in a supermarket, items as large as a 25-pound turkey (roughly 16×13×8 inches) may qualify as "small" because a user of mobile device 113—e.g., a shopper—would typically have a metal shopping cart in which they can place goods. As another example, if the mobile device and tags are located in a small equipment warehouse where each user would have a small, hand-carried basket, items larger than a small box of nails (roughly 2×3×3.5) may qualify as "large" because users may not be able to carry many items at once. Mobile device 113 may, in some embodiments, define what constitutes a "large" item based on the preferences of the user. In other embodiments, merchant 105 and/or data stored on the tag (e.g., tag 116E), may define whether an item is "large."

In any case, if the item associated with tag 400 is "large," or if the user desires it, the item may be brought to the front of the store for the user of mobile device 113. For example, if mobile device 113 detects an item that is too large to place into a cart but small enough to place into a vehicle, mobile device 113 may prompt the user of mobile device 113 to confirm whether the item should be brought to the front of the store (e.g., near the POS device 109 and/or inside of zone 112) or to a pickup department in the store. If the consumer wishes the item brought to the front of the store, mobile device 113 may send a message indicating this. The process may then continue to step 408, where merchant device 105 may initiate the movement of the item. This includes, for example, notifying a store clerk (e.g., by sending a message to a wireless device held by the clerk) to obtain the item from a storeroom or the shelf and bring it to zone 112 or a package pickup department in the store. (These steps, as well as others, may also be performed by a computer system dedicated or partially dedicated to determining how to locate and move the item for the user.) The process may continue to step 411.

In step 411, mobile device 113 may add the item associated with tag 400 to the list on mobile device 113. Adding the item to the list may also comprise, for example, storing an indication of whether the item is being carried or moved by the consumer (e.g., located in a cart, a basket, or carried in the consumer's arms), whether the item is being moved (or will be moved) by a store clerk (e.g., to the front of the store or a package pickup department), or whether the item will be shipped to the consumer's home.

In step 413, mobile device 113 determines whether or not other tags were detected in the vicinity of mobile device 113. If so, the process may continue to step 403, where mobile device 113 may read data from the next detected tag.

In either case (i.e., whether or not more tags are present), after adding tag 400 to the list in step 411, the process may continue to FIG. 4B. (In some embodiments, the process may continue to FIG. 4B only for items that are determined to be small enough to be carried by a user or placed in a cart/basket.)

FIG. 4B is a flowchart of an exemplary process for determining whether mobile device 113 is still within range of a previously-detected item. As explained above, in some embodiments, the process in FIG. 4B may be performed only with respect to certain items, for example, items small enough to be carried by a user or placed in a cart/basket.

The process in FIG. 4B, in some embodiments, may begin after adding a tag to a list on mobile device 113. For example, each time a tag 400 is detected and added to the list, the process in FIG. 4B may begin. (The process in FIG. 4B could be, for example, initiated as a separate thread on the processor of mobile device 113, so as to ensure mobile device 113 continues detecting other tags or presenting other information to the person utilizing mobile device 113.)

In step 421, mobile device 113 may initiate a timer for detected tag 400. The timer, in some embodiments, may be based on particular properties of tag 400 and mobile device 113. For example, in embodiments where tag 400 is a powered tag, such as one implemented in accordance with Bluetooth Low Energy (BLE) standards, tag 400 may be programmed to advertise data on a periodic basis, such as every 500 milliseconds. Mobile device 113 may be configured to initiate the timer to be equal to or more than the expected timing for the advertisement. For example, if tag 400 advertises every 500 ms, mobile device may initiate a timer that fires at intervals such as 550 ms, 600 ms, or 1000 ms.

After the timer expires, mobile device 113 may determine whether tag 400 is in the vicinity of mobile device 113. For example, if the timer was set for 500 ms, mobile device 113 may determine whether it has received data in the form of Bluetooth communications during the preceding 500 ms. In step 425, mobile device 113 may determine whether tag 400 is still in the vicinity of mobile device 113, based on whether data was received from tag 400 during that time period. If so, the process may continue to step 421 to reinitiate the timer and listen for the data from tag 400 again. If not, mobile device 113 may proceed to step 427. In step 427, mobile device 113 may remove the item associated with tag 400 from the list. If mobile device 113 comes back into the vicinity of that item, it can be added to the list again, as explained above with respect to steps 401-411 in FIG. 4A.

FIG. 4C is a flowchart of an exemplary process for enabling checkout of items discovered using mobile device 113.

When a user enters a checkout zone 112 (FIG. 1), the user may know that she has entered zone 112 because of signage, markings, or the like. Mobile device 113 may determine that it is inside of checkout zone 112 because of checkout tag 111. One or more checkout tags 111 may be used to indicate that the area around tag(s) 111 comprises checkout zone 112. Zone 112 may be used, in some embodiments, to indicate to mobile device 113 that the current area is for finalizing transactions. For example, if implemented in a merchant location, checkout zone 112 may represent a payment area, where tags are detected and the price associated with each item is tallied for payment. As another example, if implemented in a warehouse, checkout zone 112 may represent a shipment area, where tags are counted and a shipping bill is printed or transmitted to ensure that the items in the area make it to a job site.

In embodiments where tag 400 is a powered tag, step 432 may represent a periodic sending of data by tag 400, such as once every 500 milliseconds. In embodiments where checkout tag 111 is a powered tag, step 434 may represent a periodic sending of data by checkout tag 111, such as once every 250 milliseconds.

In step 431, mobile device 113 may poll for checkout tag 111. Polling for checkout tag 111 may comprise, for example, determining whether checkout tag 111 is broadcasting a signal indicating the existence of checkout zone 112. (For example, instead of a UUID or major/minor identifiers, as transmitted by tag 400, checkout tag 111 may transmit other information indicating the existence of the zone.) In step 433, if mobile device 113 has detected checkout tag 111, the process may then proceed to step 435. In step 435, mobile device 113 may finalize the list on mobile device 113 (e.g., by adding data to the list indicating that it is ready for checkout), and may send the list to merchant device 105. The list sent to merchant device 105 may include, for example, the name of the items, identifier(s) associated with each tag, the location of the item (e.g., in a cart/requested to be shipped), or other information.

In step 437, merchant device 105 may receive the list and determine the price for each item on the list. For example, merchant device 105 may query database 107 for each tag identifier received in order to determine the price for each associated item, add each price together, determine appropriate tax and/or shipping charges, and generate a final amount for payment. In step 439, merchant device 105 may send the list (along with any determined price) to POS device 109.

In step 441, POS device 109 may receive the list from merchant device 105. POS device 109 may also scan checkout zone 112 to determine which tags, and thus which items, are located in checkout zone 112. In step 443, POS device 109 may compare the items determined as being in checkout zone 112 with the items on the list received in step 441. Steps 445 and 447 represent POS device 109 modifying the received list. For example, if the list received in step 441 includes {"bacon," "cheddar cheese," and "hard rolls"}, but the items determined in step 441 include pork roll, eggs, cheddar cheese, and hard rolls, POS device may, in step 445, remove bacon from the list and, in step 447, add pork roll and eggs to the list.

In step 449, POS device 109 may generate and display a final list for approval by the user. (In some embodiments, displaying the final list may be performed by mobile device 113.) POS device 109 and/or mobile device 113 may then prompt the user to approve the list of items. If the user approves the list, the process continues to step 455 and POS device 109 processes the transaction (e.g., by sending a transaction request to FSP 103 in FIG. 1). If the user does not approve the list, the process continues to step 453, where the user may utilize mobile device 113 to modify the list (e.g., by removing items from the list).

In some embodiments, POS device 109 and merchant device 105 may be combined into a single device or may perform different combinations of the steps illustrated in FIG. 4C. Additionally, in some embodiments, steps 437-455 may be performed by one or more of mobile device 113, merchant device 105, or POS device 109.

Figure 5A:
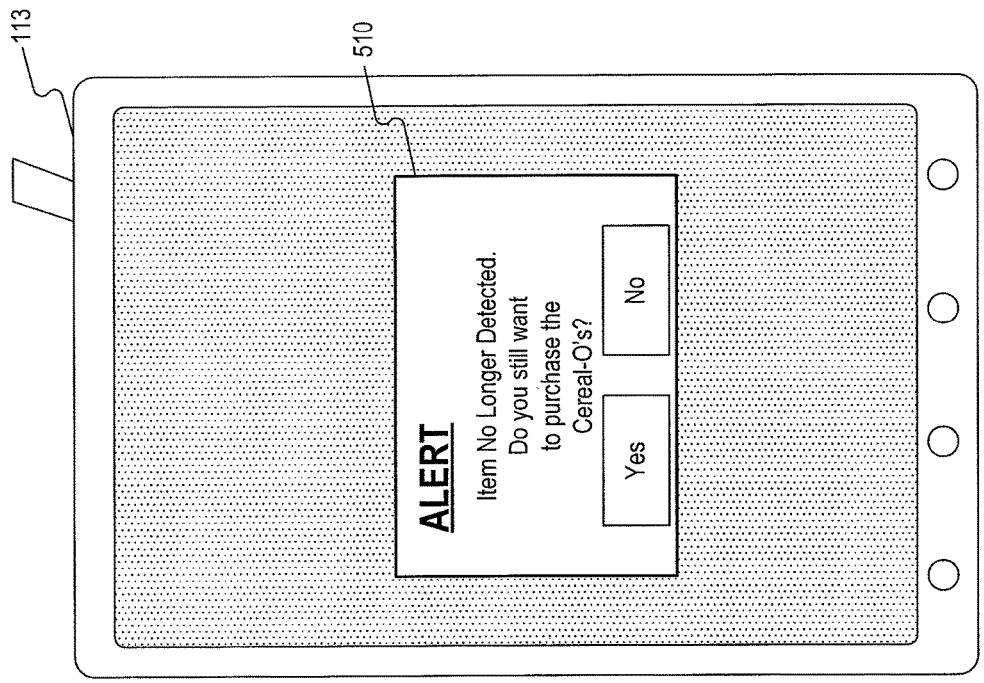
FIG. 5A is a diagram of an exemplary user interface for a mobile device, providing information on goods in a list associated with the mobile device and goods near the mobile device.

FIG. 5A is a diagram of an exemplary user interface for mobile device 113, providing information on goods in a list associated with mobile device 113 and goods near mobile device 113.

The user interface in FIG. 5A may include two portions—a portion 500 indicating items that are in the vicinity of mobile device 113 (e.g., detected using the scanning methods explained above) and a portion 508 indicating items that are already in a list (e.g., a shopping cart).

Portion 500 includes two sections—one of items that are small enough to fit inside of a cart/basket and/or to be carried by a consumer (e.g., a box of cereal). In exemplary FIG. 5A, each item in the first section (labeled "Cart Items") is accompanied by two buttons. When a user presses on button 501A (labeled "ADD"), mobile device 113 may add the associated item to a shopping cart or list stored on the device. When the user presses on button 503A (labeled "?") mobile device 113 may present information about the item (such as price, name, a picture, location, or the like).

In exemplary FIG. 5A, each item in the second section of portion 500 (labeled "Large Items") is accompanied by three buttons. When a user presses on button 505A (labeled "FRONT"), mobile device 113 sends a communication to merchant device 105 or POS device 109 indicating the user's desire that the item be brought to the front of the store or otherwise prepared for pickup. When a user presses on button 506A (labeled "SHIP"), mobile device 113 sends a communication to merchant device 105 or POS device 109 indicating the user's desire that the item be prepared for shipping to the consumer's home, office, or other location. When the user presses on button 507A (labeled "?") mobile device 113 may present information about the item (such as price, name, weight, shipping costs, size, a picture, or the like).

Portion 508 indicates items that are on a list associated with mobile device 113. For example, the items on the list may be in a shopping cart (in the case of a store), a book list (in the case of a library), or a requisition list (in the case of a warehouse). In exemplary FIG. 5A, each item in portion 508 (labeled "Current List") is accompanied by two buttons. Button 509A (labeled "CART") indicates that the associated item is currently in a shopping cart or list stored on the device. When the user presses on button 509B (labeled "⊖") mobile device 113 may remove the item from the list or prompt the user to confirm that she wishes to remove it from the list.

Figure 5B:
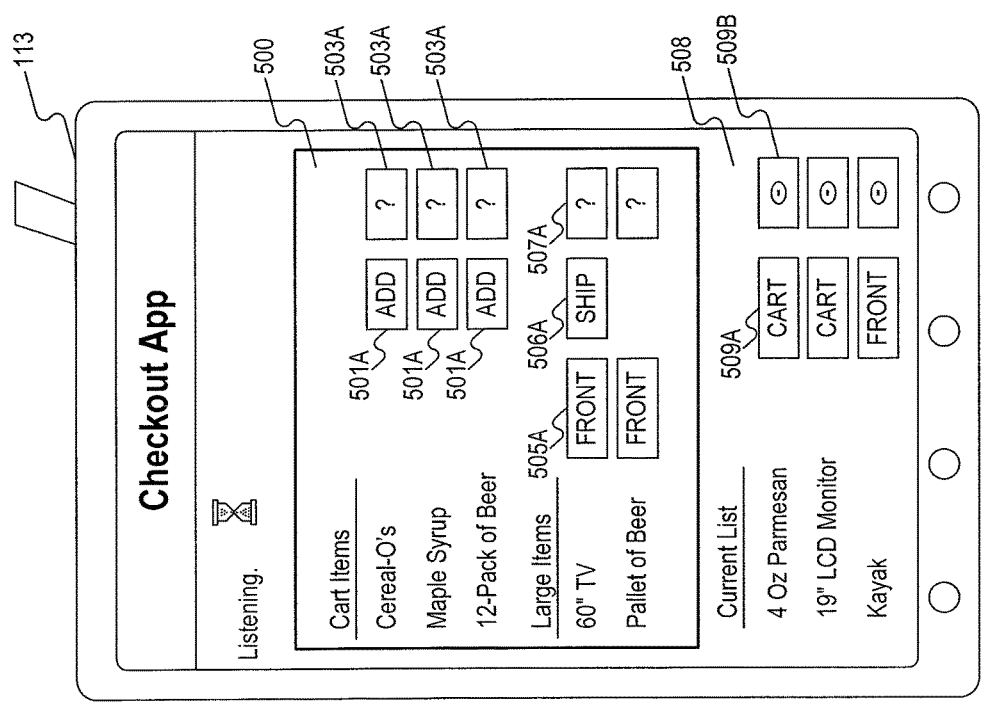
FIG. 5B is a diagram of an exemplary user interface for a mobile device, requesting confirmation that an item is no longer desired.

FIG. 5B is a diagram of an exemplary user interface for mobile device 113, requesting confirmation that an item is no longer desired. If mobile device 113 detects that tag 400 is no longer in the vicinity of mobile device 113, mobile device 113 may indicate that the tag is no longer detected and request that the user confirm that the item should be removed from the list of items. If the user presses "Yes," the item may be removed. If, however, the user presses "No," the item may be maintained in the shopping cart, but the user may be asked to confirm that he still has the item in his possession.

Figure 5D:
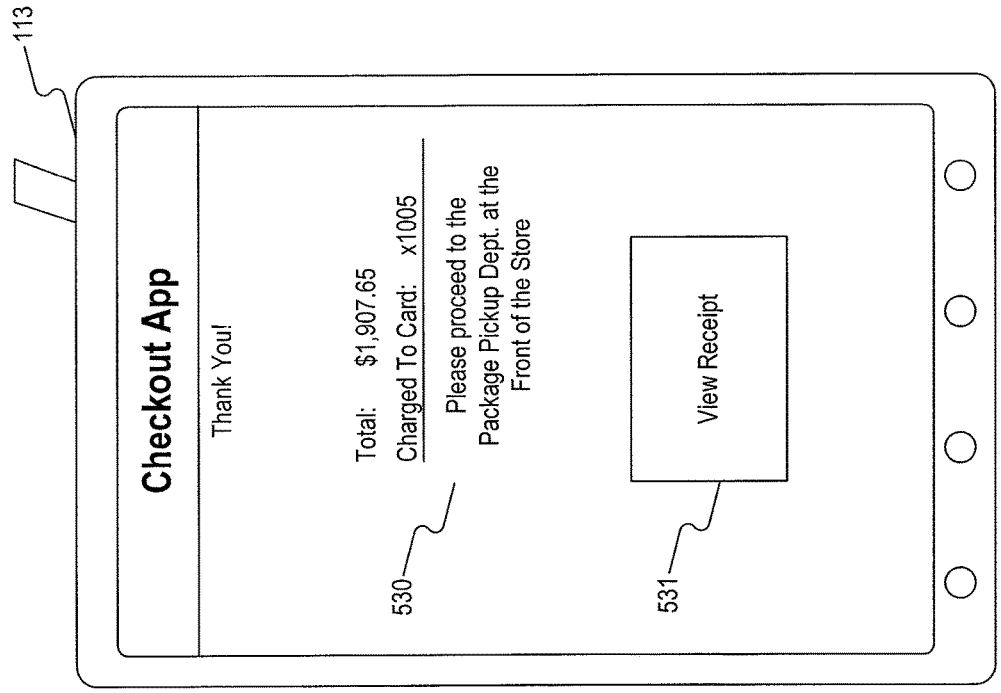
FIG. 5D is a diagram of an exemplary user interface for a mobile device, providing a final receipt related to purchased items.
Figure 5C:
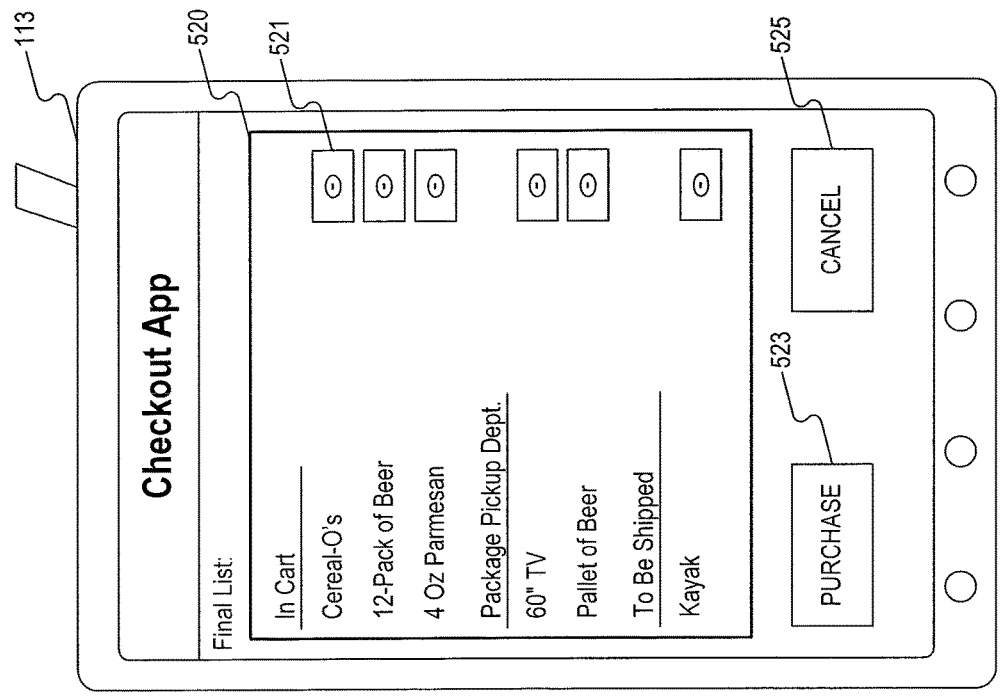
FIG. 5C is a diagram of an exemplary user interface for a mobile device, providing a list of items in a shopping cart before checkout.

FIG. 5C is a diagram of an exemplary user interface for mobile device 113, providing a list of items in a shopping cart before checkout. In some embodiments, mobile device 113 may present the interface in FIG. 5C when the mobile device determines that a checkout tag 112 is in the vicinity of mobile device 113 (e.g., steps 433-435 in FIG. 4C). This could indicate, for example, that the user desires to purchase the items and leave the store.

The interface in FIG. 5C may display a finalized list of items 520. The finalized list may include, for example, items that are small enough to be carried or placed in a basket/cart (under "In Cart"), items that must be picked up by the user after finishing the transaction (under "Package Pickup Dept."), and items that will be shipped to the user's home after finishing the transaction (under "To Be Shipped"). A user may remove an item from the final list 520 by using corresponding button 521. If the user presses button 523, mobile device 113 may initiate processing of the transaction (e.g., by authorizing a POS device to initiate a credit card-based transaction to purchase the items). If the user presses button 525, mobile device 113 may prompt the user to continue shopping or call a store clerk for assistance.

FIG. 5D is a diagram of an exemplary user interface for mobile device 113, providing a final receipt 530 related to purchased items. After a user completes the transaction (e.g., by pressing button 523 in FIG. 5C), mobile device 113 may present a short receipt for the transaction, indicating the amount of money charged to a credit card and instructing the user to proceed to the package pickup department to receive one or more purchased goods. The user may also press on button 531 to view a full receipt with all items listed.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A merchant monitoring system for detecting tags, comprising:
   a processor; and
   a memory containing instructions that, when executed by the processor, cause the system to perform operations comprising:
   scanning for emitted signals from a plurality of tags and a plurality of mobile devices, wherein the plurality of mobile devices are associated with a plurality of customers;
   receiving emitted signals from the plurality of tags and the plurality of mobile devices;
   detecting a first tag associated with an item in proximity to the first tag in a first physical area;
   sending item information associated with the first tag to cause a first mobile device to present the item information;
   detecting that the first tag moved within proximity of a second tag associated with a second physical area;
   determining whether the item is a first type of item or a second type of item whereby:
   if the first tag is associated with the first type of item, adding the information to a list stored in a database associated with the merchant, and
   if the first tag is associated with the second type of item, presenting a request on the first mobile device to confirm the addition of the information to the list, and based on receiving a confirmation to add the information to the list, adding the information to the list;
   detecting that the first tag moved out of proximity from the second tag, whereby:
   if the first tag is associated with the first type of item, removing the information from the list, and
   if the first tag is associated with the second type of item, presenting a request on the first mobile device to confirm the removal of the information to the list, and based on receiving a confirmation to remove the information from the list, removing the information from the list;
   detecting that the first mobile device moved within a third physical area; and
   sending the list to a processing terminal.

2. The system of claim 1, wherein the emitted signals are in the 2.4 Ghz range.

3. The system of claim 1, the operations further comprising initiating communication with the plurality of tags and the plurality of mobile devices over Wi-Fi.

4. The system of claim 1, the operations further comprising:
   maintaining a timer;
   measuring a first time interval that the first mobile device is within proximity to the first tag;

determining, at the end of the first time interval, whether the first tag is in proximity of the first mobile device; and removing the first tag from the list when the first tag is not detected at the end of the first interval.

5. The system of claim 1, the operations further comprising:

sending, to the first mobile device, a first confirmation request based on the list; and receiving, from the first mobile device, a first confirmation.

6. The system of claim 5, the operations further comprising:

sending, to the processing terminal, a second confirmation request based on the list; and receiving, from the processing terminal, a second confirmation.

7. The system of claim 6, the operations further comprising:

receiving, from the mobile device, a revision to either add an item to the list or remove an item from the list; and sending the revision to the processing terminal.

8. The system of claim 1, wherein:

the list comprises information about items for purchase, the first area, the second area, and the third area comprise a store, the second area is a shopping cart, and the third area is a checkout area of the store.

9. The system of claim 8, wherein:

the processing terminal is associated with the checkout area of the store; and the processing terminal, after receiving the list, determines a sale price of the item on the list.

10. A method for detecting tags, comprising:

scanning for emitted signals from a plurality of tags and a plurality of mobile devices, wherein the plurality of mobile devices are associated with a plurality of customers;

receiving emitted signals from the plurality of tags and the plurality of mobile devices;

detecting a first tag associated with an item in proximity to the first tag in a first physical area;

presenting item information associated with the first tag on a first mobile device;

detecting that the first tag moved to within proximity of a second tag associated with a second physical area;

determining whether the item is a first type of item or a second type of item whereby:

if the first tag is associated with the first type of item, adding the information to a list, and if the first tag is associated with the second type of item, presenting a request on the first mobile device to confirm the addition of the information to the list, and based on receiving a confirmation to add the information to the list, adding the information to the list;

detecting that the first tag moved out of proximity to the second tag, whereby:

if the first tag is associated with the first type of item, removing the information from the list, and if the first tag is associated with the second type of item, presenting a request on the first mobile device to confirm the removal of the information to the list, and based on receiving a confirmation to remove the information from the list, removing the information from the list;

detecting that the first mobile device moved within a third physical area; and sending the list to a processing terminal.

11. The method of claim 10, further comprising initiating communication with the plurality of tags and the plurality of mobile devices over Wi-Fi.

12. The method of claim 10, further comprising:

maintaining a timer;

measuring a first time interval that the first mobile device is within proximity to the first tag;

determining, at the end of the first time interval, whether the first tag is in proximity of the first mobile device; and removing the first tag from the list when the first tag is not detected at the end of the first interval.

13. The method of claim 10, further comprising:

sending, to the first mobile device, a first confirmation request based on the list; and receiving, from the first mobile device, a first confirmation.

14. The method of claim 13, further comprising:

sending, to the processing terminal, a second confirmation request based on the list; and receiving, from the processing terminal, a second confirmation.

15. The method of claim 14, further comprising:

receiving, from the mobile device, a revision to either add an item to the list or remove an item from the list; and sending the revision to the processing terminal.

16. The method of claim 10, wherein:

the list comprises information about items for purchase, the first area, the second area, and the third area comprise a store, the second area is a shopping cart, and the third area is a checkout area of the store.

* * * * *